US008312121B2

(12) United States Patent
Ogawa

(10) Patent No.: US 8,312,121 B2
(45) Date of Patent: Nov. 13, 2012

(54) STORAGE SYSTEM COMPRISING FUNCTION FOR ALLEVIATING PERFORMANCE BOTTLENECK

(75) Inventor: Junji Ogawa, Sagamihara (JP)

(73) Assignee: Hitachi, Ltd., Tokyo (JP)

( * ) Notice: Subject to any disclaimer, the term of this patent is extended or adjusted under 35 U.S.C. 154(b) by 314 days.

(21) Appl. No.: 12/007,089

(22) Filed: Jan. 7, 2008

(65) Prior Publication Data

US 2008/0183871 A1 Jul. 31, 2008

(30) Foreign Application Priority Data

Jan. 29, 2007 (JP) ................................. 2007-017277

(51) Int. Cl.
*G06F 15/173* (2006.01)
(52) U.S. Cl. ........................................ 709/223; 718/105
(58) Field of Classification Search .................. 709/223; 718/105
See application file for complete search history.

(56) References Cited

U.S. PATENT DOCUMENTS

| 5,289,535 | A  | * | 2/1994  | Bogart et al. ............ 379/201.01 |
| 6,434,613 | B1 | * | 8/2002  | Bertram et al. ............... 709/223 |
| 6,728,832 | B2 | * | 4/2004  | Yamamoto et al. ........... 711/114 |
| 6,732,193 | B1 |   | 5/2004  | Burton et al. |
| 7,155,587 | B2 |   | 12/2006 | Eguchi et al. |
| 7,370,142 | B2 |   | 5/2008  | Yasuda et al. |
| 7,503,045 | B1 | * | 3/2009  | Aziz et al. ..................... 718/104 |
| 2002/0049842 | A1 | * | 4/2002  | Huetsch et al. ............... 709/225 |
| 2002/0065930 | A1 | * | 5/2002  | Rhodes ......................... 709/232 |
| 2002/0124137 | A1 | * | 9/2002  | Ulrich et al. .................. 711/113 |
| 2004/0260875 | A1 | * | 12/2004 | Murotani et al. ............. 711/114 |
| 2005/0172084 | A1 |   | 8/2005  | Jeddeloh |
| 2005/0267929 | A1 |   | 12/2005 | Kitamura |
| 2006/0090163 | A1 |   | 4/2006  | Karisson et al. |
| 2006/0112247 | A1 | * | 5/2006  | Ramany et al. ............... 711/165 |
| 2006/0112301 | A1 |   | 5/2006  | Wong |

FOREIGN PATENT DOCUMENTS

| EP | 1 758 017 A1 | 2/2007 |
| JP | 05-224825 | 9/1993 |
| JP | 10-003357 | 1/1998 |
| JP | 2004-178169 | 11/2002 |
| JP | 2005-242690 | 9/2005 |
| JP | 2005-250582 | 9/2005 |

OTHER PUBLICATIONS

European Patent Office extended search report on application No. 08250042.2 dated Nov. 7, 2011; 8 pages.
Japan Patent Office action on application No. 2007-017277 dated Oct. 5, 2011; pp. 1-3.

* cited by examiner

*Primary Examiner* — Thomas Dailey
(74) *Attorney, Agent, or Firm* — Foley & Lardner LLP

(57) ABSTRACT

A storage system has a first type resource and a second type resource, which are different types of resources having a relationship in which, when the load on one type of resource becomes higher, the load on the other type of resource becomes lower, and this storage system comprises a process controller. The process controller executes processing such that the load of the other type of resource becomes higher when the load on the one type of resource, of the first type resource and the second type resource, is high and the load on the other type of resource is not so high.

18 Claims, 7 Drawing Sheets

| RESOURCE | PERFORMANCE | UTILIZATION RATE |
|---|---|---|
| HOST I/F | 80MB/s, 1000IOPS | 60% |
| CPU | — | 40% |
| CACHE MEMORY | — | 40% |
| INTERNAL BUS | 200MB/s | 30% |
| DISK BUS | 100MB/s | 40% |
| DISK 1(1) | 20MB/s, 200IOPS | 80% |
| DISK 2(1) | 20MB/s, 200IOPS | 80% |
| ⋮ | ⋮ | ⋮ |

301

| CPU UTILIZATION RATE | DISK UTILIZATION RATE CALCULATION METHOD |
|---|---|
| HIGH | FIRST DISK UTILIZATION RATE CALCULATION METHOD |
| MEDIUM | SECOND DISK UTILIZATION RATE CALCULATION METHOD |
| LOW | THIRD DISK UTILIZATION RATE CALCULATION METHOD | form the following explanation.
STORAGE SYSTEM COMPRISING FUNCTION FOR ALLEVIATING PERFORMANCE BOTTLENECK

CROSS-REFERENCE TO PRIOR APPLICATION

This application related to and claims the benefit of priority from Japanese Patent Application number 2007-17277, filed on Jan. 29, 2007, the entire disclosure of which is incorporated herein by reference.

BACKGROUND

The present invention relates to load distribution inside a storage system.

Generally speaking, storage system applications are diverse. For example, during the day, a storage system can be used in a transaction process, and at night, it can be used in a backup process. When the type of process for which it is being used differs, the characteristics of the input/output (I/O) from an outer device (e.g. higher-level device) to the storage system will differ. For example, in a transaction process, a large number of I/O requests are received per unit of time, but in a backup process, the number of I/O requests received per unit of time is less than that for a transaction process.

When I/O characteristics differ, the type of resource subjected to heightened load inside the storage system differs. Since a high-load resource constitutes a performance bottleneck, the performance of the storage system (hereinafter, may be called "system performance") is restricted. Here, for example, "system performance" refers to IOPS (number of I/O requests received from an outer device per second) and/or length of response time (the length of time from the issuing of an I/O request by an outer device until the outer device receives a response to this I/O request from the storage system).

For example, in Japanese Patent Laid-open No. 2004-178169, hereinafter referred to as literature 1, there is proposed a system, which evaluates the performance of the respective resources of a storage system, and presents a user with a performance bottleneck.

The elimination of a performance bottleneck is important for enhancing the performance of a storage system. In general, elimination of a performance bottleneck signifies augmenting the resource that constitutes the performance bottleneck. For example, when a storage device becomes a performance bottleneck, measures are taken to increase the number of storage devices.

However, as described hereinabove, if I/O characteristics differ, the type of resource likely to become a performance bottleneck will differ. Thus, it is necessary to construct a large configuration so as to respectively augment the types of resources that are likely to become performance bottlenecks for each respective I/O characteristic pattern, and to prevent a performance bottleneck from occurring no matter what the I/O characteristic pattern. Since augmenting a resource is generally costly, the configuration described above would constitute a high-cost system. It is also wasteful since an augmented resource is not utilized unless a performance bottleneck occurs.

SUMMARY

Therefore, an object of the present invention is to alleviate a performance bottleneck in a storage system without augmenting a resource.

Other objects of the present invention should become clear from the following explanation.

A storage system has a first type resource and a second type resource, which are different types of resources having a relationship in which, when the load on one type of resource becomes higher, the load on the other type of resource becomes lower, and this storage system comprises a process controller. The process controller executes a process such that, when the load on the one type of resource, of the first type resource and second type resource, is high and the load on the other type of resource is not so high, the load on the other type of resource becomes higher.

DESCRIPTION OF THE PREFERRED EMBODIMENTS

Figure 1:
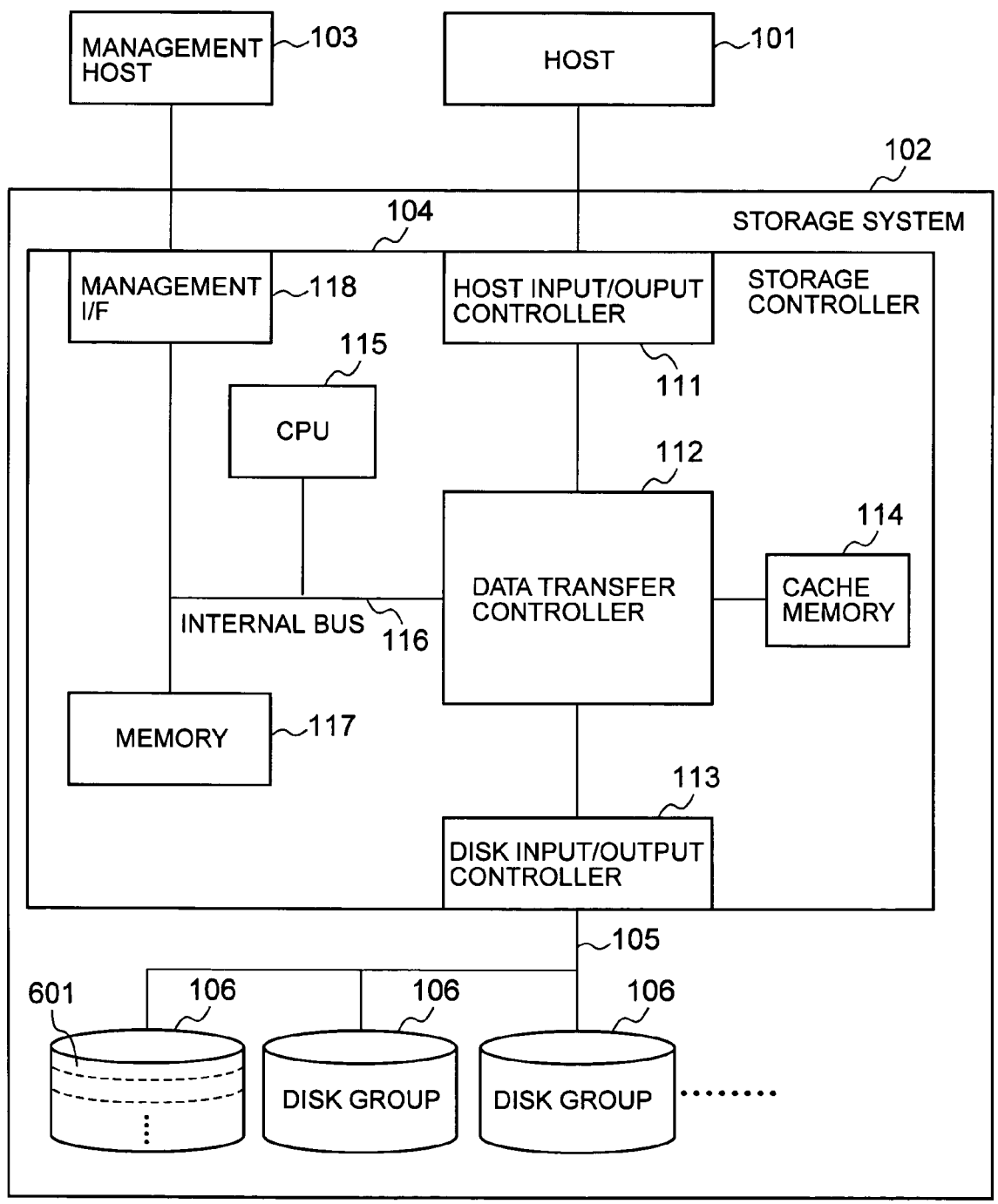
FIG. 1 is a diagram showing one example of a configuration of a computer system related to a first embodiment of the present invention, and one example of an internal configuration of a storage system comprising this computer system.

An overview of the aspects of an embodiment of the present invention will be explained.

A storage system comprises a first type resource and a second type resource, which are different types of resources having a relationship in which, when the load on the one type of resource becomes higher, the load on the other type of resource becomes lower; and a process controller, which can execute a process such that, when the load on the one type of resource, of the first type resource and second type resource, is high, and the load on the other type of resource is not so high, the load on this other type of resource becomes higher.

The second type of resource, for example, is each of a plurality of storage devices. A hard disk drive, flash memory device, or various other types of storage devices can be used as a storage device. As a hard disk drive, a storage device can comprise a hard disk drive, which comprises a communication interface (I/F) that conforms to a FC (Fibre Channel), SCSI (Small Computer System Interface), SAS (Serial Attached SCSI), SATA (Serial ATA) or the like.

A first type resource, for example, is a processor. A processor generates and executes an I/O command, which is specified by analyzing an I/O request received from an outer device, to each of one or more storage devices of a plurality of storage devices.

In one embodiment, the storage system can further comprise a control method execution unit. The control method execution unit can execute a process in accordance with a specified control method, of a first control method, in which the load on the first type resource is high, and the load on the second type resource is low, and a second control method, in which the load on the first type resource is lower than in the first control method, and the load on the second type resource is higher than in the first control method. In this case, "executes a process such that the load on the other type of resource becomes higher" described hereinabove specifies the first control method when this other type of resource is the first type resource, and specifies the second control method when this other type of resources is the second type resource. Here, the first control method can be constituted as a control method for supplementing the load on the above-mentioned second type resource by executing a first specified process in the first type resource. The second control method can be constituted as a control method for raising the load on the second type resource higher than when the first control method is executed by executing a second specified process in which the load is smaller than that placed on the first type resource by the first specified process. The first specified process can include a process in which the processor executes a plurality of commands to each of a plurality of storage devices by rearranging them in a sequence, which differs from the generation sequence thereof. This, for example, is considered especially useful when the storage device is the type, which can store one incomplete I/O command, but cannot store a plurality of such commands. The second specified process can include a process in which the processor executes a plurality of I/O commands to each of a plurality of storage devices according to the generation sequence thereof.

In one embodiment, the storage system also has a third type resource, which does not fall under the above-described relationship shared by the first type resource and the second type resource. The storage system can further comprise a load measurement unit for measuring the respective loads of the first type resource, second type resource and third type resource. The process controller can be constituted such that, even if the load measured for the one type of resource, of the first type resource and the second type resource, is high (for example, this measured load exceeds a first threshold value corresponding to this type) and the load measured for the other type of resource is not so high (for example, this measured load is lower than the first threshold value or a second threshold value (a threshold value that is smaller than this first threshold value) corresponding to this type), if the measured load of the third type resource is high (for example, if this measured load is higher than the first threshold value corresponding to the third type), a process in which the measured load of the other type of resource becomes higher is not executed. The third type resource can be at least one of a communication interface device for an outer device (for example, a host input/output controller, which will be explained hereinbelow), a first communication channel to which the processor is connected (for example, an internal bus, which will be explained hereinbelow), and a second communication channel to which each of the plurality of storage devices is connected (for example, a disk bus, which will be explained hereinbelow).

In one embodiment, the load measurement unit can measure the load of a storage device using a first load measurement method. The first load measurement method is one, which performs a measurement based on the total of a measurement time, which is the length of time for measuring this load, and one or more operating times, which is one or more lengths of time in this measurement time for which an incomplete I/O command exists in this storage device.

In one embodiment, the load measurement unit can measure the load of a storage device using a second load measurement method. The second load measurement method is one, which performs a measurement based on a length of time, which is the length of time for the respective I/O commands issued to this storage device, from the time said processor issues an I/O command to this storage device until an end-report is received from this storage device as the response to this I/O command.

In one embodiment, the load measurement unit can measure the load of a storage device using a third load measurement method. The third load measurement method is one which performs a measurement based on the number of incomplete I/O commands that exist in this storage device during the measurement time, which is the length of time for measuring this load. The number of incomplete I/O commands that exist during the measurement time is the total number of the plurality of incomplete I/O commands that respectively exist in the plurality of units of time during the measurement time.

In one embodiment, the load measurement unit can, in accordance with the processor load, select and execute one load measurement method from among a plurality of load measurement methods constituted by at least two of the above-described first through third load measurement methods. Here, for example, when the processor load is high, the load measurement unit selects the first load measurement method, and when the processor load is low, it selects the second or third load measurement method.

In one embodiment, the above-described "when the measured load on one type of resources, of the first type resource and the second type resource, is high, and the load of the other type of resource is not so high", can be treated as a situation in which the current time falls within a prescribed time period.

The respective units described hereinabove can be constructed by hardware, a computer program, or a combination thereof (for example, realizing one part by a computer program, and realizing the remainder by hardware). A computer program is executed by being read into a prescribed processor. Further, when information processing is carried out by reading a computer program into a processor, a memory or other such storage area that exists in a hardware resource can be utilized accordingly. Further, a computer program can be installed in the computer from a CD-ROM or other such recording medium, or it can be downloaded to the computer via a communications network.

A number of embodiments of the present invention will be explained in detail hereinbelow.

FIRST EMBODIMENT

FIG. 1 is a diagram showing one example of a configuration of a computer system related to a first embodiment of the present invention, and one example of an internal configuration of a storage system comprising this computer system.

A host 101 and management host 103 can issue a request to a storage system 102.

The host 101 is a computer for issuing an I/O request to the storage system 102. An I/O request can be a file level I/O request, or a block level I/O request. Therefore, the storage system 102 can comprise a function for receiving and processing a file level I/O request, and can comprise a function for receiving and processing a block level I/O request. By executing a process in accordance with an I/O request, either write-targeted data that accords with an I/O request is written to a disk 601 specified by analyzing this I/O request, or read-targeted data is read out from a disk 601 specified by analyzing the I/O request.

The management host 103 is a computer for managing the storage system 102. The management host 103 can acquire desired information from the storage system 102 by issuing a desired request to the storage system 102. Further, the management host 103 can carry out a variety of settings for the storage system 102.

The storage system 102 is constituted by a storage controller 104, a disk group 106, and a bus 105 for the connection thereof.

The storage controller 104, for example, is a controller constituted from one or a plurality of circuit boards. The storage controller 104 comprises a host input/output controller 111, a data transfer controller 112, a disk input/output controller 113, a cache memory 114, a CPU 115, a memory 117, a management I/F 118 and an internal bus 116 to which each of these is connected.

The host input/output controller 111 is an interface device for either the host 101 or a network, and, for example, exchanges data or control signals with the host 101 and so forth using a fibre channel protocol or iSCSI. In so doing, the host input/output controller 111 converts back and forth between a protocol for communications with a device that is outside the storage system 102, and a protocol for communications with a device that is inside the storage system 102.

The data transfer controller 112, for example, is a LSI (Large-Scale Integration) circuit, and transfers data between the CPU 115, the host input/output controller 111, the disk input/output controller 113, and the cache memory 114. The data transfer controller 112 can append a guarantee code to data being transferred.

The disk input/output controller 113 is an interface device for the respective disks 601 constituting the respective disk groups 106, and exchanges data or control signals with the respective disks 601. In so doing, the disk input/output controller 113 converts back and forth between a protocol of a device (disk 601) that is outside of the storage controller 104, and a protocol of a device that is inside the storage controller 104.

The cache memory 114 temporarily stores data (data written to a disk group 106 in accordance with a write request from the host 101, or data read out from a disk group 106 in accordance with a read request from the host 101), which is exchanged between the host input/output controller 111 and the disk input/output controller 113. The data transfer controller 112 transfers data read/written from/to a disk group 106 between the host/disk input/output controllers 111, 113 by the host 101, and, in addition, transfers this data to the cache memory 114.

That is, the cache memory 114 has two roles, a role as a read cache, and a role as a write cache. When used as a read cache, that is, when data read out from a disk group 106 is stored in the cache memory 114, if a read request is generated once again for the same data, the data that accords with this read request can be read from cache memory 114 instead of from the disk group 106. Further, by reading data, which is expected to be read from the host 101 in the future, into the cache memory 114 beforehand, when the pertinent data read is actually generated, the pertinent data can be read out from cache memory 114. The read cache can shorten the response time for a read request. Conversely, when used as a write cache, that is, when data from the host 101 is stored in the cache memory 114, write-end (the response to a write request from the host 101) can be reported to the host 101 at the point when this data is stored in the cache memory 114. Consequently, it is possible to shorten the response time for a write request. Further, performance can be enhanced by a write request from the host 101 asynchronously performing a write to a disk group 106 from a state in which a plurality of write data has been integrated together.

Furthermore, an access destination that accords with an I/O request from the host 101 will be a disk group 106 of any of a plurality of disk groups 106, and for this reason, is as follows. That is, in this embodiment, a disk group 106, for example, is a RAID (Redundant Array of Independent (or Inexpensive) Disks) group constituting a plurality of disks, and one or a plurality of LUs (logical units) are formed on the basis of the storage space of the RAID group. The LU, which constitutes the access destination, is specified by analyzing an I/O request, and access is carried out to this LU. Thus, the access destination that accords with an I/O request from the host 101 is a disk group 106 of any of a plurality of disk groups 106 (more specifically, for example, the disk related to the LU that constitutes the access destination within a disk group 106). The "disk" referred to in the explanation of this embodiment is an abbreviation for a disk-type storage device (for example, a hard disk drive, DVD drive, or the like). Another type of storage device, for example, a flash memory, can be used instead of a disk.

A variety of computer programs and various types of information are stored in the memory 117, and various types of processing are carried out by the CPU 115 calling up and executing respective types of computer programs. Hereinafter, the entity that performs a process, which is carried out by the CPU 115 reading in and executing a computer program, may be called a computer program instead of a CPU for ease of understanding.

The management I/F 118 is used to receive a configuration change, configuration acquisition, or other such management command, which is issued to the storage system 102. In FIG. 1, the management I/F 118 and the host input/output interface (controller) 111 are separate devices, but they can also be the same device.

Further, the management host 103 and host 101 can also be integrated (that is, they can be constituted from a single computer). Furthermore, in FIG. 1, the host 101 storage system 102 and management host 103 can each constitute a plurality of units. Further, the storage system 102 and host 101 and/or management host 103 can also form a network (for example, a SAN (Storage Area Network) or LAN (Local Area Network).

Figure 2:
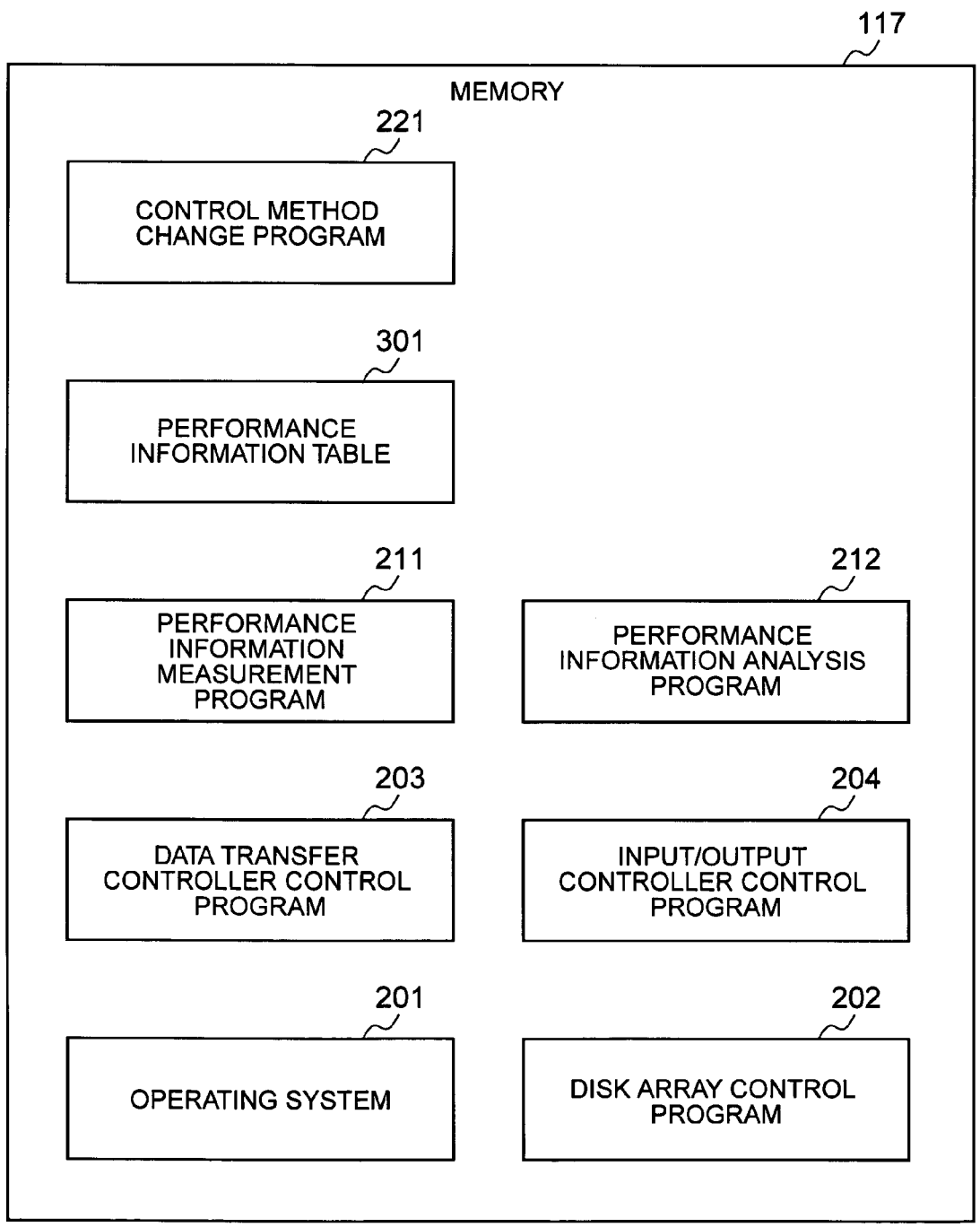
FIG. 2 shows various types of computer programs and information stored in the memory of the storage system.

FIG. 2 shows a variety of types of computer programs and information that are stored in the memory 117.

The computer programs stored in the memory 117, for example, include an operating system 201, disk array control program 202, data transfer controller control program 203, input/output controller control program 204, performance information measurement program 211, performance information analysis program 212, and control method change program 221. Further, the information stored in the memory 117, for example, includes a performance information table 301.

The operating system 201 performs scheduling for the respective computer programs 202, 203, 204, 211, 212, and 221.

The disk array control program 202, for example, analyzes an I/O request from the host 101, specifies the disk group 106 that will constitute the access destination, and issues to this specified disk group 106 an I/O command by way of the data transfer controller control program 203 and input/output controller control program 204. Further, the disk array control program 202 processes an I/O request from the host 101 in accordance with a control method selected from a plurality of types of control methods. The plurality of types of control methods include two types: a CPU assist control method, which lowers the load on the CPU and raises the load on a disk 601, and a disk assist control method, which raises the CPU load and lowers the load on a disk 601. When the CPU assist control method is selected, the disk array control program 202 sends to a disk 601 a plurality of I/O commands, which were generated for processing in accordance with an I/O request from the host 101, without arranging same in any special way. More specifically, for example, every time an I/O command is generated, the disk array control program 202 sends this I/O command to a disk 601. That is, a plurality of I/O commands are respectively sent in the sequence in which they were generated. Conversely, when the disk assist control method is selected, the disk array control program 202 arranges the respective issuing sequence of a plurality of I/O commands, which are generated for processing in accordance with an I/O request from the host 101, on the basis of the respective access destination addresses (for example, the LBA (Logical Block Address) or CHS (head, cylinder, sector)) of these plurality of I/O commands, and respectively sends these plurality of I/O commands to a disk 601 in the arranged sequence.

The data transfer controller control program 203 is the driver for the data transfer controller 112, and controls the transfer of data between the respective controllers 111, 113.

The input/output controller control program 204 is the driver for the host input/output controller 111 and the disk input/output controller 113, and controls the operation of the respective controllers 111, 113.

The performance information measurement program 211 measures the performance information of prescribed resources present inside the storage system 102, and records the measured performance information in the performance information table 301.

The performance information analysis program 212 analyzes the performance information table 301 in the memory 117, and specifies a resource that has become a performance bottleneck.

The control method change program 221 changes the behavior of the disk array control program 202. More specifically, for example, the control method change program 221 selects a control method to be executed by the disk array control program 202 from among the above-mentioned plurality of types of control methods.

Performance information recorded in the performance information table 301 is information related to the extent of the performance being exhibited by, and the extent of the load being applied to the respective resources inside the storage system 102.

Figures 3, 4:
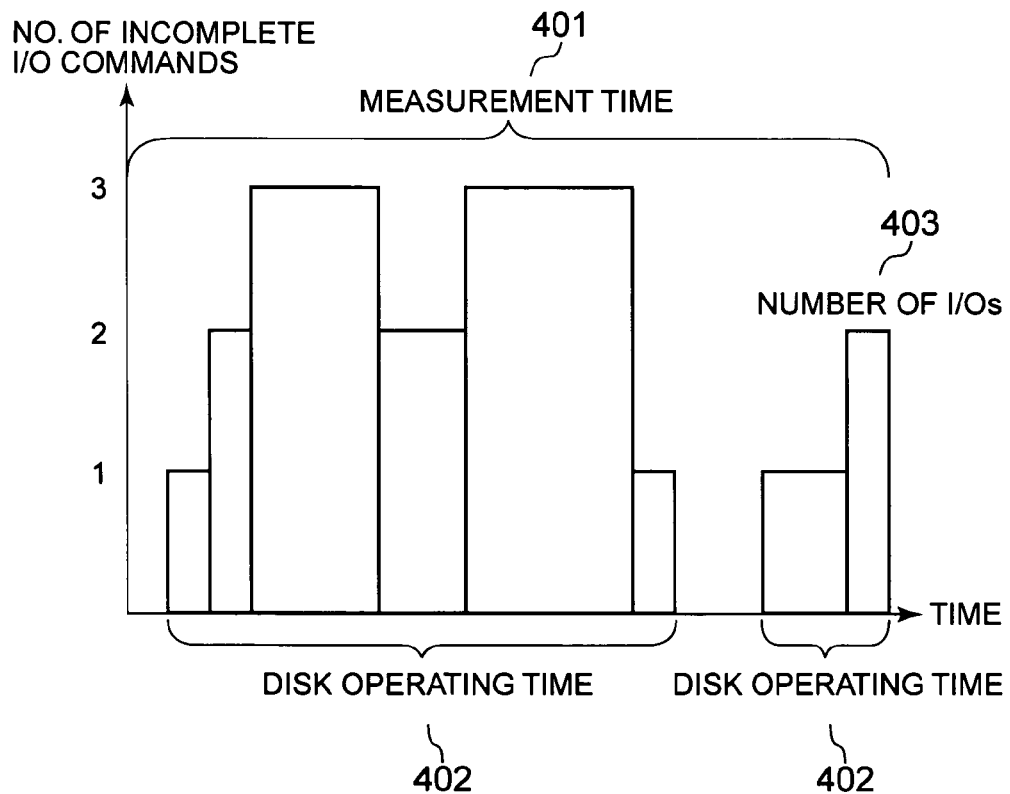
FIG. 3 is a diagram showing one example of a structure of a performance information table.
FIG. 4 is a schematic diagram of a first disk utilization rate calculation method.

FIG. 3 is a diagram showing on example of a structure of the performance information table 301.

Performance information of respective resources, which are each measured at one or more points in time, is recorded in the performance information table 301. The performance information table 301 shown in the figure shows performance information recorded at a certain point of one or more points in time. Furthermore, with regard to the resources, the numbers in parentheses, such as disk1(1), disk 2(1), . . . , denote the identification numbers of the disk groups 106, and the numbers not in parentheses denote the identification numbers of the disks 601. That is, it is clear from this performance information table 301 which disk 601 belongs to which disk group 106.

Performance information is measured for prescribed resources, and the performance information measured constitutes a set comprising performance and utilization rate.

As resource performance, for example, throughput per unit of time can be used. By contrast, the resource utilization rate, for example, can be the ratio of throughput when 100% represents the throughput in a case in which this resource has completely expended the performance of this resource. If there is a type of resource for which defining performance-expended throughput is problematic, a definition of some sort must be carried out for the utilization rate for this type of resource.

More specifically, for example, the respective utilization rates for the host I/F (host input/output controller) 111, internal bus 116, and disk bus 105 are equivalent to how much bandwidth is being used (the transfer rate) when the maximum bandwidth capable of being used (the maximum bandwidth) is considered to be 100%. Further, for the utilization rate of the CPU, a figure, which is determined by measuring the time spent not performing useful processing and finding the percentage of overall operating time accounted for thereby, becomes the CPU idle rate, and the figure arrived at by subtracting this value from 100% becomes the CPU utilization rate. As for the disk utilization rate, due to the difficulty of stipulating what constitutes 100% performance, it is necessary to define a method for calculating the utilization rate thereof.

FIG. 4 is a diagram showing one example of a method for calculating a disk utilization rate.

This diagram shows a state in which the number of incomplete I/Os that a certain disk (hereinafter called "disk A" for the sake of convenience) receives changes over time. The measurement time 401 denotes the overall time spent executing a measurement for determining the utilization rate of disk A. Disk operation time 402 is the time during the measurement time 401 that disk A operated in order to process a received I/O command. Number of I/Os 403 shows the number of incomplete I/O commands that disk A receives at a certain point in time, and this number increases in accordance with the issuing of an I/O command from the storage controller 104, and decreases in accordance with an I/O command being completely processed by disk A.

In the method shown in FIG. 4, the utilization rate of disk A is a value reached by dividing the disk operation time 402 by the measurement time 401. In general, to conceal disk A response time and realize high performance, the storage controller 104 will issue a plurality of I/O commands without waiting for an I/O command issued by disk A to end (end response from disk A). Thus, it becomes a state in which disk A receives a plurality of incomplete I/O commands. According to the method shown in FIG. 4, it is determined that one or more incomplete I/O commands have been received, and that disk A is operating, without taking into account the processing status of this plurality of I/O commands.

Figure 5:
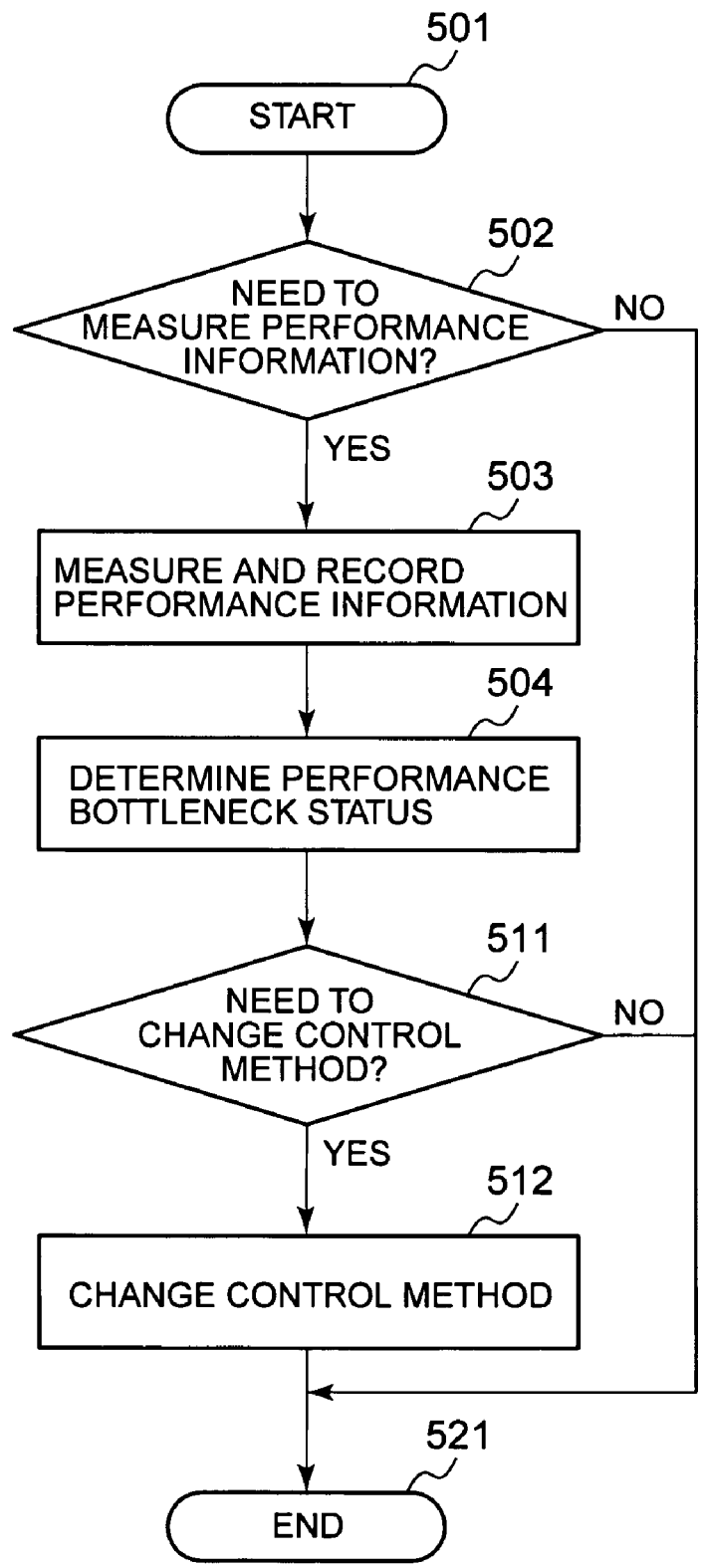
FIG. 5 is a flowchart showing a performance information analysis process.

FIG. 5 is a flowchart showing a performance information analysis process of this embodiment.

First, performance information analysis processing is started (Step 501). Since this performance information analysis process can be operated regardless of whether an I/O request issued from the host 101 has been received or not, it can be started using a timer or the like.

Next, the performance information measurement program 211 determines whether or not it is necessary to measure the performance information (Step 502). Specifically, for example, it is determined if the storage system 102 is currently in a first mode for acquiring performance information, or in a second mode for changing a control method based on performance information. Since performance information acquisition itself generates overhead, a determination is executed in accordance with a mode such as those mentioned above. Instead of this, for example, when the utilization rate of a prescribed type of resource recorded in a recently created performance information table 301 exceeds a prescribed value, a determination not to acquire performance information can be made to prevent load from increasing further.

When it is determined in Step 502 that there is no need to measure performance information, (for example, when it is determined to be the second mode), processing proceeds to Step 521 and ends. Conversely, when it is determined in Step 502 that there is a need to measure performance information, (for example, when it is determined to be the first mode), processing proceeds to Step 503.

In Step 503, the performance information measurement program 211 measures the performance information of the respective resources, and records the measured performance information in the performance information table 301. Specifically, for example, the performance information measurement program 211 measures the performance of each resource, uses the measured performance to calculate a utilization rate via a method that is suitable for the pertinent resource, and records the measured performance and the calculated utilization rate as a set in the performance information table 301. That is, it is performance that is actually measured, but since a utilization rate is calculated using the measured performance, substantially both performance and the utilization rate, that is, performance information is measured. Further, the recording of the performance information is for storing a performance status for a certain period of time so that the overall status of a resource is not determined solely on the temporary performance status of the extremely short period at the point of Step 503 execution. Further, to calculate a disk utilization rate, the number of incomplete I/O commands for each disk must be determined, and as a method for realizing this, for example, it is possible to use a method in which the performance information measurement program 211 monitors the operation of the disk array control program 202, and records in the memory 117 information related to the results of monitoring (for example, the number of incomplete I/O commands for a particular disk at a particular point in time).

Next, the performance information analysis program 212 determines performance bottleneck status (Step 504). Specifically, for example, the performance information analysis program 212, based on the latest performance information sets (performance information of the respective resources) recorded in Step 503 described hereinabove, and one or more past performance information sets, determines the presence of a resource that constitutes a performance bottleneck, and the present of a resource that does not constitute a performance bottleneck (and if such a resource exists, the extent of its load availability. More specifically, for example, a plurality of first utilization rate threshold values and a plurality of second utilization rate threshold values respectively corresponding to a plurality of resources are prepared. The second utilization rate threshold value is smaller than the first utilization rate threshold value for all resources. The performance information analysis program 212 compares the utilization rate of a resource (for example, the latest utilization rate) against the first utilization rate threshold value corresponding to the resource, and compares the utilization rate of the resource against the second utilization rate threshold value corresponding to the resource for the respective resources, and stores information denoting the results of the respective comparisons (hereinafter, performance bottleneck determination results information) in the memory 117. The performance bottleneck determination results information, for example, comprises information on each resource as to whether or not the utilization rate exceeds the first utilization rate threshold, whether or not the utilization rate falls below the second utilization rate threshold, the difference between the utilization rate and the first utilization rate threshold value, and the difference between the utilization rate and the second utilization rate threshold value. A resource that constitutes a performance bottleneck, for example, is a resource for which the utilization rate exceeds the first utilization rate threshold value. A resource that does not constitute a performance bottleneck is a resource for which the utilization rate falls below one of the first utilization rate threshold value or the second utilization rate threshold value. The extent of load availability of a resource that does not constitute a performance bottleneck is the difference between that resource's utilization rate and the first utilization rate threshold value and/or the second utilization rate threshold value.

Figures 8, 9:
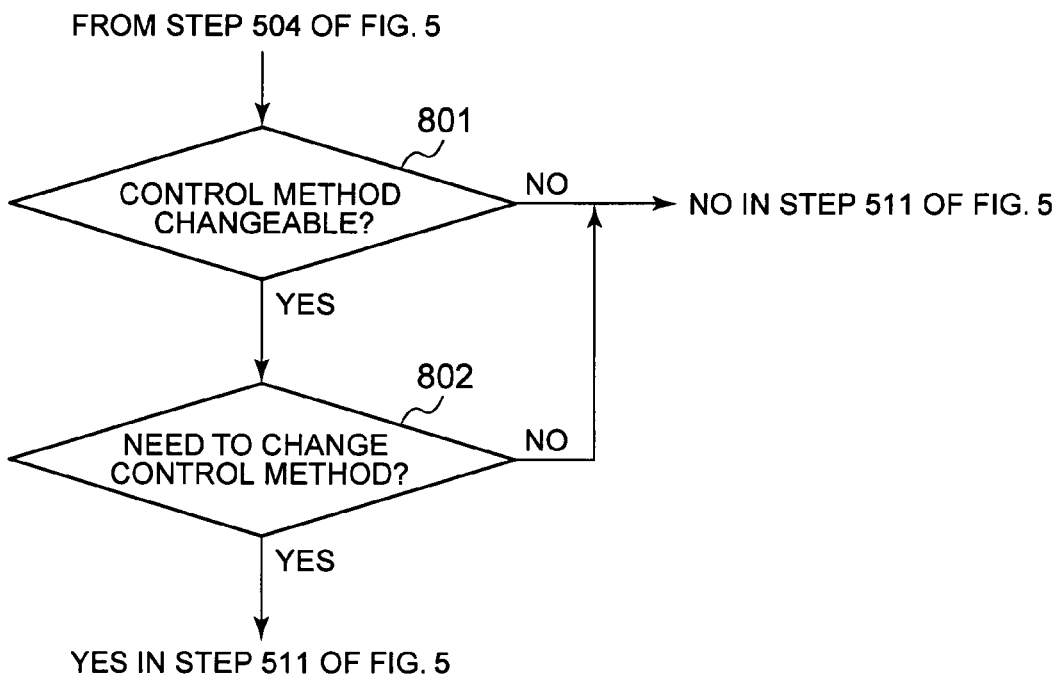
FIG. 8 shows one example of the details of Step 511 of FIG. 5.
FIG. 9 shows an example of a configuration of a calculation method control table prepared in a fourth embodiment of the present invention.

Next, the control method change program 221 determines whether or not to change the control method (Step 511). Specifically, as shown in FIG. 8, for example, the control method change program 221 determines whether or not changing the control method would be effective (Step 801), and when it determines that a change would be effective (Step 801: YES), it then determines whether or not changing the control method is necessary (Step 802), and when it determines that a change is necessary (Step 802: YES), it makes the determination to change the control method. By contrast, when at least one of Step 801 and Step 802 is NO, the determination is made not to change the control method.

In Step 801, for example, the control method change program 221 references the performance bottleneck determination results information, and checks the performance bottleneck status of a resources, which is a type of resource besides the CPU 115 and respective disks, and which is involved in receiving and processing an I/O request (hereinafter, specified resource). The specified resource, for example, is at least one of the host input/output controller 111 (host I/F), internal bus 116 and disk bus 113. If at least one of these one or more specified resources (for example, all the specified resources) is a resource for which the utilization rate exceeds the first utilization rate threshold value, the determination is that changing the control method would not be effective. This is because, when the utilization rate of a specified resource exceeds the first utilization rate threshold value, most likely the specified resource will become a performance bottleneck and system performance will not improve even if a control method change is carried out.

In Step 802, for example, the control method change program 221 can carry out the following processing. That is, the control method change program 221 references the performance bottleneck determination results information, and determines whether or not the utilization rate exceeds the first utilization rate threshold value, and whether or not the utilization rate falls below the second utilization rate threshold value for the CPU and a plurality of disks, respectively. Then, for example, if the current case is one in which the utilization rate of the CPU exceeds the first CPU utilization rate threshold value (the first utilization rate threshold value corresponding to the CPU), the utilization rates of one or more disks falls below the second disk utilization rate threshold value (second utilization rate threshold value corresponding to a disk), and the CPU assist control method has not been selected (hereinafter, CPU non-assist case), the determination is that the control method needs to be changed. Further, for example, if the current case is one in which the utilization rate of the CPU falls below the second CPU utilization rate threshold value, the utilization rates of one or more disks exceed the first disk utilization rate threshold value, and the disk assist control method has not been selected (hereinafter, disk non-assist case), the determination is that the control method needs to be changed.

Here, "one or more disks" signifies that only one disk can be targeted, or a plurality of disks can be targeted. The number of disks can be set to a prescribed number. A plurality of disks can be all the disks that constitute a prescribed number of disk groups 106.

Further, in at least one of a CPU non-assist case and a disk non-assist case, the control method change program 221 further determines whether or not changing the control method will enhance system performance, and upon determining that system performance would be enhanced, determines the need for changing the control method. For example, for each of a CPU assist control method and a disk assist control method, a respective target value is established for the CPU utilization rate and the disk utilization rate, and when control is implemented so as to achieve the respective target value in a post-change control method, a determination can be made using a prescribed method as to whether or not system performance will be enhanced. For example, information (hereinafter, system performance-related information), in which there are a plurality of combinations of the CPU utilization rate and disk utilization rate, and a plurality of system performance expectation values (anticipated system performance) respectively corresponding to this plurality of combinations are registered, is stored in the memory 117, and the control method change program 221 can specify from the system performance-related information a system performance expectation value that corresponds to the respective target values of the CPU utilization rate and disk utilization rate in the post-change control method, and can determine whether or not the specified system performance expectation value exceeds the current system performance, and whether or not system performance improves. A determination as to whether or not system performance improves can also be made using another method instead.

As a concrete example, for instance, the control method change program 221 determines that it is necessary to change the control method when the current situation is one in which the CPU assist control method is being employed, the CPU utilization rate is 40% (less than the second utilization rate threshold value), and the drive utilization rate is 90% (value that exceeds the first utilization rate threshold value), and when it is possible that the performance of the system as a whole will be enhanced (when the system performance expectation value corresponding to a combination of a CPU utilization rate of 70% and a disk utilization rate of 70% exceeds the current system performance) by changing the control method from the CPU assist control method to the disk assist control method (for example, by raising the CPU utilization rate 30% because the target value for the CPU utilization rate under the disk assist control method is 70%, and lowering the drive utilization rate to 20% because the because the target value for the disk utilization rate under the disk assist control method is 70%).

When a determination is made in Step 511 to change the control method, processing proceeds to Step 521, and the process ends. Conversely, when a determination is made in Step 511 not to change the control method, processing proceeds to Step 512.

In Step 512, the control method change program 221 changes the control method that the disk array control program 202 is carrying out. Consequently, thereafter the disk array control program 202 executes control in accordance with the post-change control method.

According to the first embodiment described hereinabove, the storage system 102 is constituted so as to be able to implement control, which accords with a control method selected from among a plurality of control methods, and when one of a CPU 115 and disk 601, which are two types of resources having interrelated utilization rates, constitutes a performance bottleneck, and the other has leeway in its utilization rate, can switch the selected control method to a control method, which reduces the extent of the utilization rate of the one, and strengths the extent of the utilization rate of the other. Consequently, it is possible to relieve a performance bottleneck without augmenting a resource.

Further, according to the first embodiment described hereinabove, when the disk assist control method is selected, the CPU 115 rearranges the issuing sequence of the I/O commands issued to a disk 601. This is considered useful when the disk 601 is the type of disk in which one incomplete I/O command can accumulate inside the disk 601, specifically, for example, a SATA type of disk.

SECOND EMBODIMENT

A second embodiment of the present invention will be explained hereinbelow. In so doing, primarily the points of difference with the first embodiment will be explained, and explanations of points of commonality with the first embodiment will either be omitted or simplified (This will be the same for the subsequent third embodiment and beyond.).

In this second embodiment, the method for determining a disk utilization rate differs from that of the first embodiment.

Figure 6:
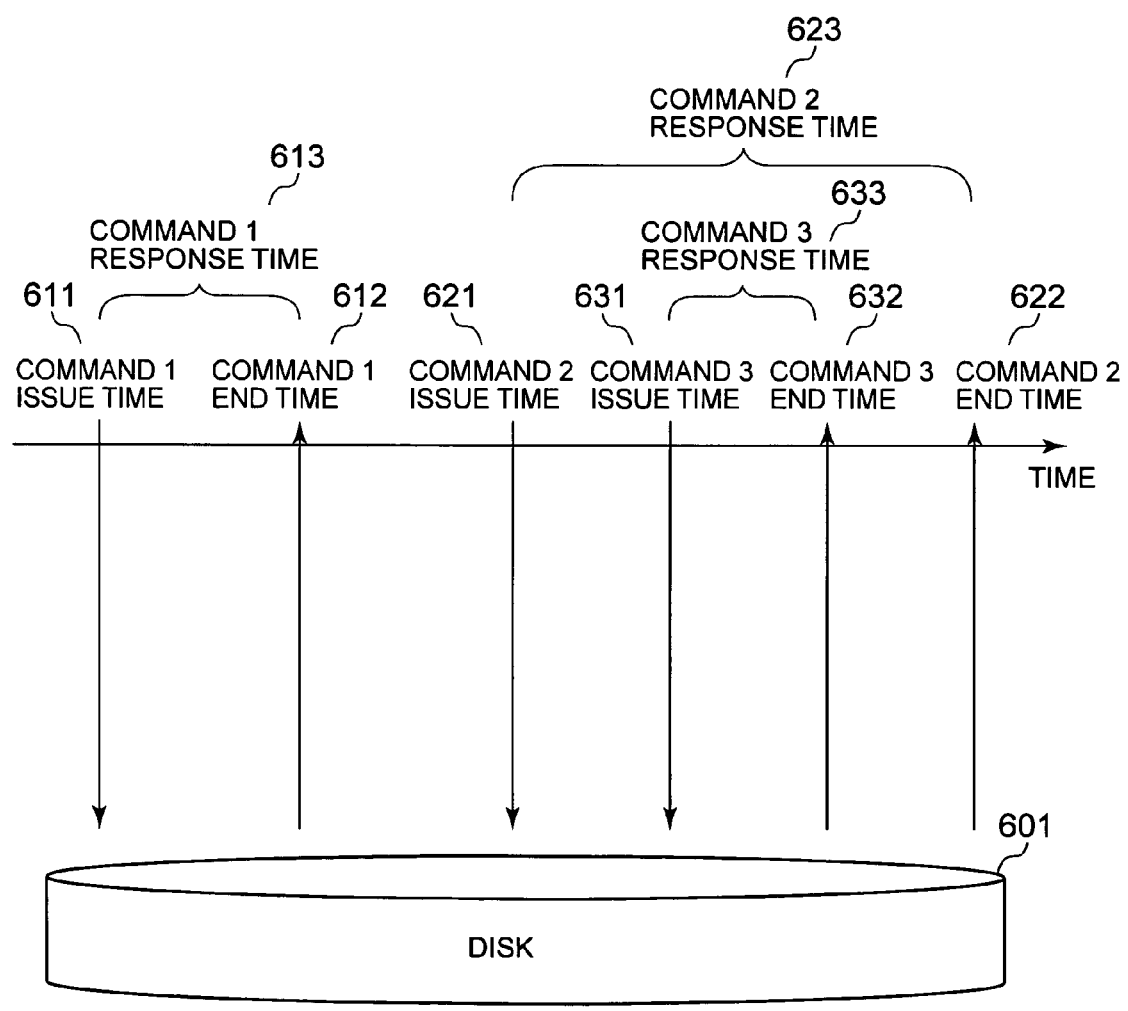
FIG. 6 is a schematic diagram of a second disk utilization rate calculation method in a second embodiment of the present invention.

FIG. 6 is a diagram showing an example of a disk utilization rate calculation method of the second embodiment of the present invention.

The performance information measurement program 211 records in the memory 117 a command 1 issue time 611, which is the time at which a certain command 1 was issued to a disk 601, and a command 1 end time 612, which is the time at which a command 1 end-report was received from the disk 601, and records in the memory 117 as a command 1 response time 613 the time arrived at by subtracting the command 1 issue time 611 from the command 1 end time 612. The response time of each command is recorded by doing the same for command 2 and command 3. In this embodiment, a disk utilization rate can be determined to some extent by these command response times. To strictly define a numeral value as a disk utilization rate, it is necessary to define a state referred to as 100%, but in this method, since it is impossible to define a maximum time when disk malfunctions and I/O command multiplexing are taken into account, the size of a disk utilization rate is determined by either the amount of total response time or the amount of average response time. As mentioned above, since a disk utilization rate determined by this method is not a utilization rate arrived at by defining a certain state as 100%, the criteria will differ in accordance with the circumstances, and, for example, when the average response time is 50 ms (milliseconds), the load is determined to be high. That is, in this embodiment, a disk utilization rate is not strictly calculated as a value, but rather the size of a disk utilization rate is determined, and this determination is carried out in accordance with whether or not a response time total or an average response time exceeds or falls below a prescribed threshold value.

THIRD EMBODIMENT

In this third embodiment, the method for determining a disk utilization rate differs from that of the first embodiment.

Figure 7:
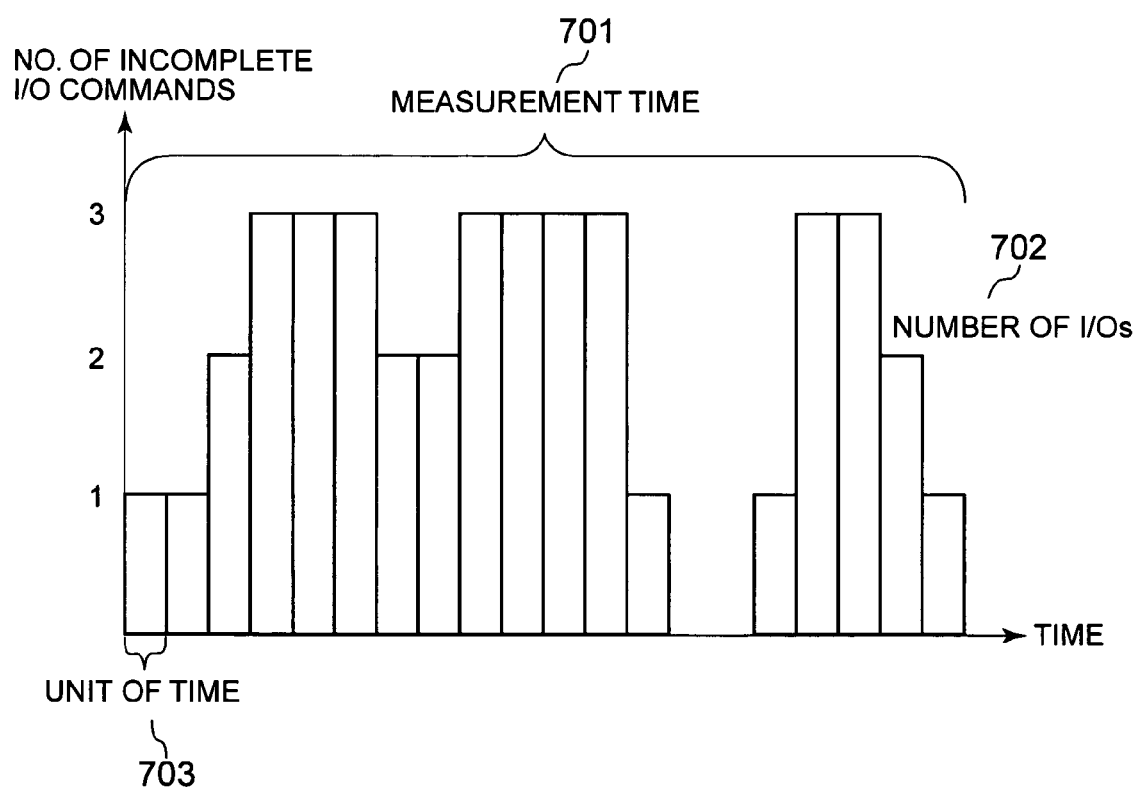
FIG. 7 is a schematic diagram of a third disk utilization rate calculation method in a third embodiment of the present invention.

FIG. 7 is a diagram showing an example of a disk utilization rate calculation method of the third embodiment of the present invention.

The performance information measurement program 211 records in the memory 117 for each unit of time 703 the number of incomplete I/O commands 702 issued to a certain disk 601 during the measurement time 701. The performance information measurement program 211 calculates as the disk utilization rate the total value of the number of incomplete I/O commands 702 relative to a maximum number of this number of incomplete I/O commands 702. In FIG. 7, the total value of the number of incomplete I/O commands 702 is 40. The maximum number of this numerical value is arrived at by multiplying the number of I/O commands a disk 601 is capable of receiving at one time by the measurement time 701, dividing by the unit of time 703, and treating this state as a 100% utilization rate. For example, when the number of I/O commands capable of being received at the same time is 10, the maximum number in FIG. 7 is 200, and the disk utilization rate becomes 40÷200=20%. However, for a normal disk, the load constitutes a sufficiently high state even when the number of I/Os is few, and most often it is impossible to increase throughput any further. Accordingly, in the third embodiment, which uses a disk utilization rate based on the above definition, it is possible to determine the need for control method change by lowering the utilization rate criteria for a disk determined to be under high load.

FOURTH EMBODIMENT

In this fourth embodiment, a disk utilization rate calculation method is employed selectively.

FIG. 9 shows an example of a configuration of a calculation method control table.

A calculation method control table 951 is recorded in the memory 117. Or, it can be incorporated into the disk array control program 202. A first disk utilization rate calculation method is the method that was explained by referring to FIG. 4. A second disk utilization rate calculation method is the method that was explained by referring to FIG. 6. A third disk utilization rate calculation method is the method that was explained by referring to FIG. 7.

According to this table 951, when the CPU utilization rate is "high", the disk utilization rate is calculated using the first disk utilization rate calculation method, when the CPU utilization rate is "medium", the disk utilization rate is calculated using the second disk utilization rate calculation method, and when the CPU utilization rate is "low", the disk utilization rate is calculated using the third disk utilization rate calculation method. Specifically, for example, the performance information measurement program 211, either regularly or irregularly, checks (or measures on its own) the CPU utilization rate recorded in the performance information table 301 (for example, the latest CPU utilization rate), and if the CPU utilization rate is in the CPU utilization rate category of "high", the program 211 selects the first disk utilization rate calculation method, if the CPU utilization rate is in the CPU utilization rate category of "medium", it selects the second disk utilization rate calculation method, and if the CPU utilization rate is in the CPU utilization rate category of "low", it selects the third disk utilization rate calculation method, and thereafter, at the time of Step 503, for example, the performance information measurement program 211 calculates the disk utilization rate using the selected disk utilization rate calculation method.

In the above-mentioned first through third disk utilization rate calculation methods, the first disk utilization rate calculation method places the least load on the CPU, and the third disk utilization rate calculation method places the highest load on the CPU. Conversely, from the standpoint of the accuracy of a disk utilization rate to be calculated, the third disk utilization rate calculation method is considered to offer the highest accuracy. According to this fourth embodiment, when the CPU utilization rate is low, the disk utilization rate is calculated using the third disk utilization rate calculation method, which is deemed the most accurate for calculated the disk utilization rate, and when the CPU utilization rate rises for one reason or another, and executing the third disk utilization rate calculation method would make the CPU a performance bottleneck, another disk utilization rate calculation method, which places a low load on the CPU is selected and executed instead of the third disk utilization rate calculation method. Further, when the CPU utilization rate is high, the first disk utilization rate calculation method is selected and executed.

The preceding explained a number of preferred embodiments of the present invention, but these embodiments are examples for explaining the present invention, and do not purport to limit the scope of the present invention to these embodiments. The present invention can be put into practice in a variety of other aspects. For example, in the fourth embodiment, one disk utilization rate calculation method of at least two disk utilization rate calculation methods can be decided based on the CPU utilization rate. Further, a type of index other than the utilization rate can be used as the index for expressing the load on a resource. Further, switching the control method can be carried out in accordance with a current time that belongs to any time period. For example, the control method change program 221 can select the CPU assist control method if the current time is a time period during which a large number of I/O requests is received per unit of time (for example, the time period during which the storage system 102 is used for transaction processing) (for example, from 9:00 a.m. until 9:00 p.m.), and can select the disk assist control method if the current time is a time period during which a smaller number of I/O requests is received per unit of time than this time period (for example, the time period during which the storage system 102 is used for backup processing) (for example, from 9:00 p.m. until 9:00 a.m.).

What is claimed is:

1. A storage system that receives and processes an input/output (I/O) request sent from an outer device, comprising:
   a plurality of disk drives,
   a processor that generates an I/O command specified by analyzing said received I/O request, and sends said I/O command to one or more of said plurality of disk drives;
   wherein said processor arranges a sequence of a plurality of I/O commands on a basis of a respective access destination address of said plurality of disk drives and sends said plurality of arranged I/O commands to each of said plurality of disk drives as a first type control, and sends said plurality of I/O commands to each of said plurality of disk drives in the sequence as a second type control;
   wherein when said processor executes said first type control, a first type of load on said processor becomes higher and a second type load on one disk drive of said plurality of disk drives becomes lower;
   wherein when said processor executes said second type control, said first type of load on said processor becomes lower and said second type load on said one disk drive of said plurality of disk drives becomes higher;
   wherein when said first type of load on said processor is higher than a first threshold value and said second type of load on said one disk drive is lower than a second threshold value and said processor executes said first type control, said processor changes from said first type control to said second type control;

wherein when said first type load on said processor is lower than said first threshold value and said second type of load on said one disk drive is higher than said second threshold value and said processor executes said second type control, said processor changes from said second type control to said first type control;

a communication interface device; and a load measuring unit for measuring the respective loads on said processor, said plurality of disk drives, and said communication interface device, wherein said processor does not execute either the first the of control or the second type of control when a measured third type load on said communication interface device is higher than a third threshold value.

2. The storage system according to claim 1, wherein each of said plurality of disk drives is a type of disk drive which can store one incomplete I/O command, but cannot store a plurality of incomplete I/O commands.

3. The storage system according to claim 1, wherein said load measurement unit measures the load on a disk drive of each of said plurality of disk drives based on a total of a measurement time, which is the length of time for measuring the load, and one or more operating times, which is one or more lengths of time in this measurement time during which an incomplete I/O command exists in the disk drive.

4. The storage system according to claim 3, wherein said load measurement unit measures the disk drive load of each of said plurality of disk drives based on the length of time which is a length of time for the respective I/O commands issued to the disk drive from when said processor issues an I/O command to the disk drive until when an end-report is received from the disk drive as a response to this I/O command.

5. The storage system according to claim 3, wherein said load measurement unit measures the disk drive load of each of said plurality of disk drives based on the number of incomplete I/O commands that exist in the disk drive during the measurement time, which is a length of time for measuring the load, and the number of incomplete I/O commands that exist during said measurement time is the total number of a plurality of incomplete I/O commands that respectively exist in a plurality of units of time during said measurement time.

6. The storage system according to claim 3, wherein said load measurement unit measures the respective loads of said plurality of disk drives using a load measurement method selected from among a plurality of load measurement methods, and wherein said plurality of load measurement methods are at least two load measurement methods of a first through a third load measurement methods, said first load measurement method is a method for measuring the disk drive load of each of said plurality of disk drives based on the total of a measurement time, which is the length of time for measuring the load, and one or more operating times, which is one or more lengths of time in the measurement time during which an incomplete I/O command exists in the disk drive, said second load measurement method is a method for measuring the disk drive load of each of said plurality of disk drives based on the length of time for the respective I/O commands issued to the disk drive from when said processor issues an I/O command to the disk drive until when an end-report is received from the disk drive as a response to the I/O command, and said third load measurement method is a method for measuring the disk drive load of each of said plurality of disk drives based on the number of incomplete I/O commands that exist in the disk drive during a measurement time, which is a length of time for measuring the load, and the number of incomplete I/O commands that exist during said measurement time is the total number of a plurality of incomplete I/O commands that respectively exist in a plurality of units of time in said measurement time.

7. The storage system according to claim 6, wherein said load measurement unit selects any of said plurality of load measurement methods in accordance with a measured load of said processor.

8. A load distribution method; comprising:

receiving an input/output (I/O) request sent from an outer device;

arranging a sequence of a plurality of I/O commands on a basis of a respective access destination address of a plurality of disk drives;

sending said plurality of arranged I/O commands to each of said plurality of disk drives as a first type control, and sending said plurality of I/O commands to each of said plurality of disk drives in the sequence as a second type control, wherein a first type of load on a processor becomes higher and a second type load on said disk drive of said plurality of disk drives becomes lower when said first type control is executed, and wherein said first type of load on said processor becomes lower and said second type load on a disk drive of said plurality of disk drives becomes higher when said second type control is executed;

wherein a change is made from said first type control to said second type control when a first type load on said processor is higher than a first threshold value and a second type load on said disk drive is lower than a second threshold value, and wherein a change is made from said second type control to said first type control when said first type load on said processor is lower than said first threshold value and said second type load on said disk drive is higher than said second threshold value; and measuring the respective loads on said processor, said plurality of disk drives, and said communication interface device using a load measuring unit, wherein said processor does not execute either the first type of control or the second type of control when a measured third type load on a communication interface device is higher than a third threshold value.

9. The storage system according to claim 1, wherein said processor arranges the sequence of said plurality of said I/O commands on the basis of the respective access destination logical block address or CHS (cylinder, head, sector).

10. The load distribution method of claim 8, wherein each of said plurality of disk drives is configured to store one incomplete I/O command, but not to store a plurality of incomplete I/O commands.

11. The load distribution method of claim 8, wherein said load measurement unit measures the load on each of said plurality of disk drives based on a total of a measurement time and one or more operating times, wherein the measurement time is for measuring the load, and wherein the one or more operating times are durations in the measurement time during which an incomplete I/O command exists in the disk drive.

12. The load distribution method of claim 11, wherein said load measurement unit measures the disk drive load of each of said plurality of disk drives based on the length of time which is a length of time for the respective I/O commands issued to the disk drive from when said processor issues an I/O command to the disk drive until when an end-report is received from the disk drive as a response to this I/O command.

13. The load distribution method of claim 11, wherein said load measurement unit is configured to measure the disk drive load of each of said plurality of disk drives based on the number of incomplete I/O commands that exist in the disk drive during the measurement time, and the number of incomplete I/O commands that exist during said measurement time is the total number of a plurality of incomplete I/O commands that respectively exist in a plurality of units of time during said measurement time.

14. The load distribution method of claim 11, wherein said load measurement unit is configured to measure the respective loads of said plurality of disk drives using a load measurement method selected from at least two of a first, a second, and a third load measurement methods for measuring the disk drive load of each of said plurality of disk drives, said first load measurement method is based on the total of the measurement time and one or more operating times, said second load measurement method is based on the length of time for the respective I/O commands issued to the disk drive from when said processor issues an I/O command to the disk drive until when an end-report is received from the disk drive as a response to the I/O command, and said third load measurement method is based on the number of incomplete I/O commands that exist in the disk drive during the measurement time and the number of incomplete I/O commands that exist during said measurement time is the total number of a plurality of incomplete I/O commands that respectively exist in a plurality of units of time in said measurement time.

15. The load distribution method of claim 14, wherein said load measurement unit is configured to select any of said first, second, and third load measurement methods in accordance with a measured load of said processor.

16. A storage system configured to receive and process an input/output (I/O) request from an outer device, the storage system comprising:
a processor configured to have a first type of load;
a plurality of disk drives configured to have a second type of load,
wherein the processor is configured to:
generate an I/O command specified by analyzing the I/O request;
sends the I/O command to one or more of the plurality of disk drives;
arrange a sequence of a plurality of I/O commands based on respective access destination addresses of the plurality of disk drives;
send the sequence of plurality of arranged I/O commands to each of the plurality of disk drives as a first type of control;
send the plurality of I/O commands to each of the plurality of disk drives in the sequence as a second type of control;
wherein the first type of control executed by the processor executes the first type of control is configured to increase the first type of load and decrease the second type of load;
wherein the second type of control executed by the processor is configured to lower the first type of load and increase the second type of load, and
wherein the processor is configured to change between the first and second types of controls based on:
if the first type of load is higher than a first threshold value and the second type of load is lower than a second threshold value, then the processor switches the second type of control, and
if the first type of load is lower than the first threshold value and the second type of load is higher than the second threshold value, then the processor changes to the first type control;
a communication interface device; and
a load measuring unit for measuring the respective loads on said processor, said plurality of disk drives, and said communication interface device,
wherein said processor does not execute either the first type of control or the second type of control when a measured third type load on said communication interface device is higher than a third threshold value.

17. The storage system of claim 16,
wherein the load measurement unit is configured to measure the load on each of the plurality of disk drives based on a total measurement time for measuring the load and one or more durations in the total measurement time,
wherein during the one or more durations an incomplete I/O command exists in the disk drive.

18. The storage system of claim 17, wherein:
the load measurement unit is configured to measure the respective loads of the plurality of disk drives using a load measurement method selected from at least two of a first, a second, and a third load measurement methods,
the first load measurement method is based on the total measurement time and the one or more durations,
the second load measurement method is based on a duration for the respective I/O commands issued to one of the plurality of disk drives from when the processor issues an I/O command to the disk drive till when an end-report is received from the disk drive as a response to the I/O command, and
the third load measurement method is based on a number of incomplete I/O commands that exist in the disk drive during the total measurement time, wherein the number of incomplete I/O commands that exist during the total measurement time is a total number of a plurality of incomplete I/O commands that respectively exist in a plurality durations in said measurement time.

* * * * *